Feb. 23, 1943.   C. A. GUSTAFSON   2,311,941
TRACTOR
Filed May 25, 1942   2 Sheets-Sheet 1
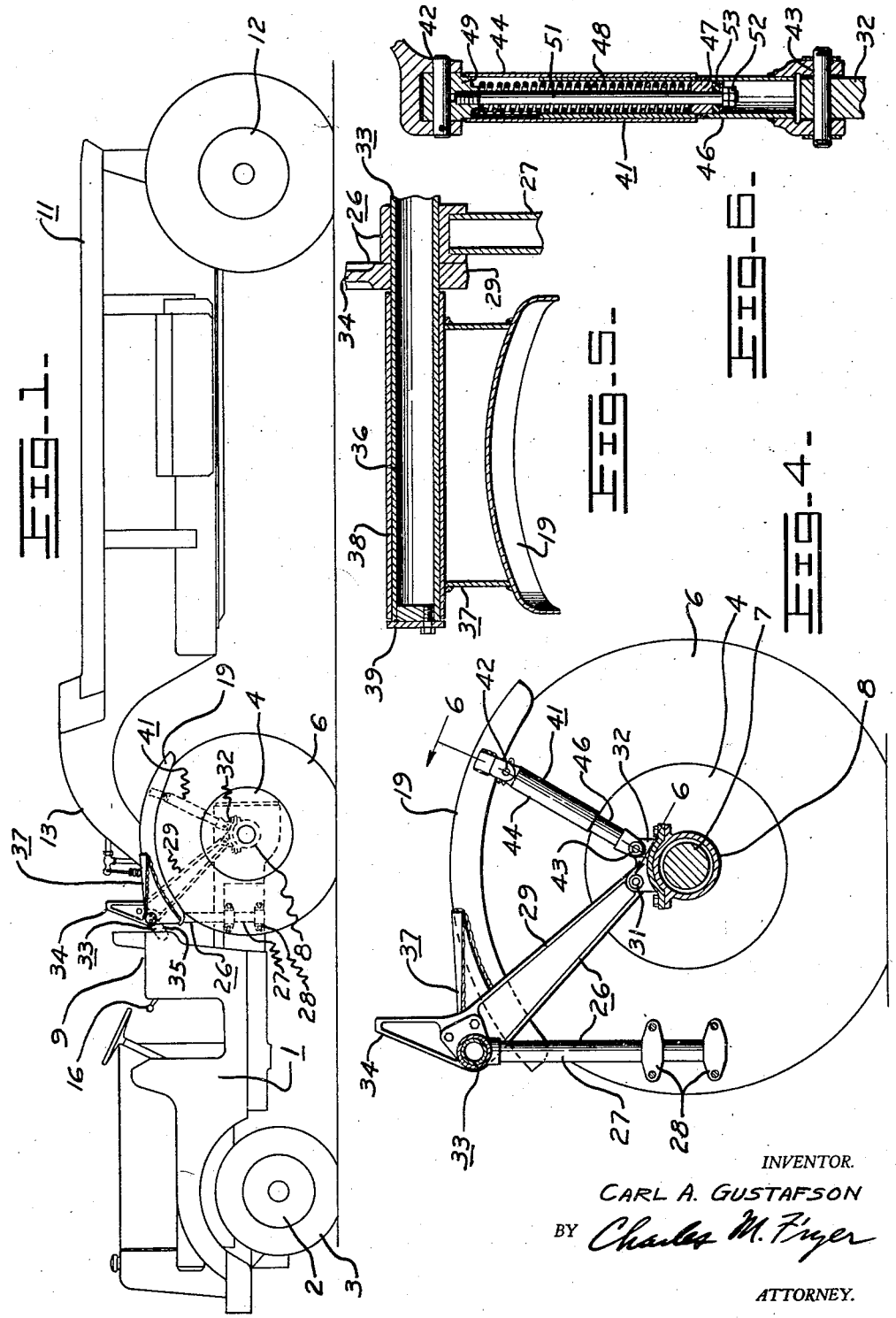
INVENTOR.
CARL A. GUSTAFSON
BY Charles M. Finger
ATTORNEY.

Feb. 23, 1943.  C. A. GUSTAFSON  2,311,941
TRACTOR
Filed May 25, 1942   2 Sheets-Sheet 2
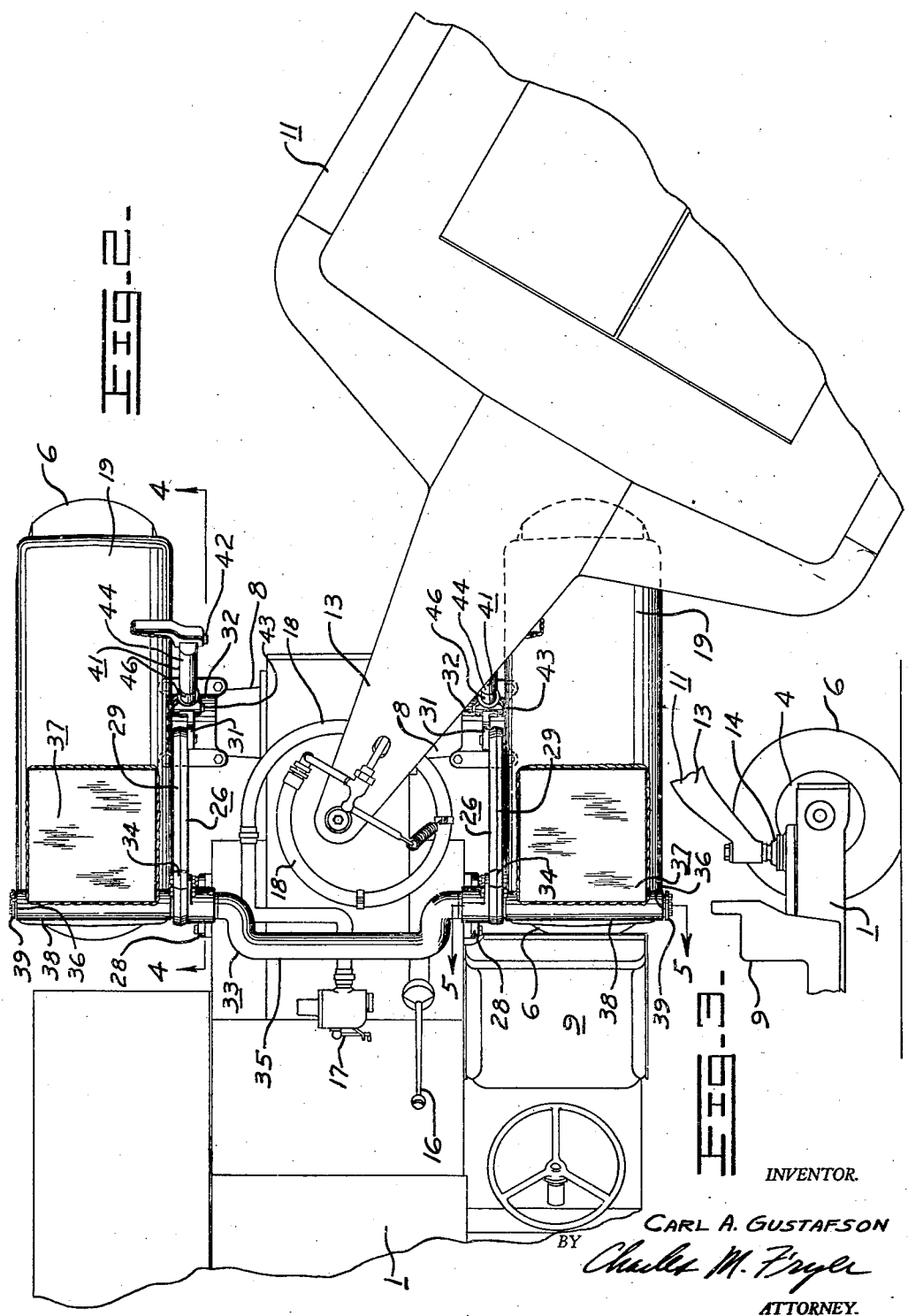
INVENTOR.
CARL A. GUSTAFSON
BY Charles M. Fryer
ATTORNEY.

Patented Feb. 23, 1943

2,311,941

UNITED STATES PATENT OFFICE 2,311,941

TRACTOR

Carl A. Gustafson, Peoria, Ill., assignor to Caterpillar Tractor Co., San Leandro, Calif., a corporation of California Application May 25, 1942, Serial No. 444,308

8 Claims. (Cl. 280—152)

My invention relates to tractors, and more particularly to a yieldable mounting for fenders associated with ground engaging means on the tractor.

In tractor-trailer vehicle combinations, such as tractor drawn earth carrying scrapers or dump wagons, a common form of attachment between the tractor and the trailer vehicle, is a draft connection or hitch at the front of the trailer vehicle, movably supported by the tractor. During relative turning movement between the tractor and the trailer vehicle, the rear ground engaging means on the tractor can pass under the draft connection which may result in the draft connection striking a fender over the ground engaging means should relative vertical movement occur between the draft connection and the ground engaging means as a result of driving over rough ground, particularly when the ground engaging means is equipped with pneumatic tires. Also, striking of the draft connection against the fender might occur should the trailer vehicle tilt angularly during the turning which might very readily obtain on sloping or uneven ground. The fender is desirable to protect the operator of the tractor from flying matter thrown by the ground engaging means, but because of such striking, a conventional rigid fender mounting would result in the fender becoming damaged.

My invention is designed to obviate this difficulty, and has as its objects, among others, the provision of an improved fender mounting which is yieldable so that the fender will not become damaged or destroyed should the previously mentioned type of draft connection strike it, and which is of simple and economical construction. Other objects of my invention will become apparent from a perusal of the following description thereof.

Referring to the drawings:

Fig. 1 is a schematic side elevational view of a tractor-trailer vehicle combination, embodying the construction of my invention.

Fig. 2 is an enlarged fragmentary plan view of a portion of the structure shown in Fig. 1, with the tractor and the trailer vehicle turned relative to each other.

Fig. 3 is a reduced fragmentary, schematic elevational view illustrating a form of universal mounting between the trailer draft connection and the tractor.

Fig. 4 is a section taken in the plane indicated by line 4—4 in Fig. 2.

Fig. 5 is a fragmentary section taken in a plane indicated by line 5—5 in Fig. 2.

Fig. 6 is a section taken in the plane indicated by line 6—6 in Fig. 4.

The yieldable fender mounting of my invention may be employed with advantage, on any type of tractor adapted for connection with any form of trailer vehicle. For purposes of illustration, I will describe such mounting in association with a form of tractor manufactured by my assignee, connected to a dump wagon. The tractor comprises body 1 mounted on steerable front ground engaging wheels 2 provided with pneumatic tires 3, and on drivable rear ground engaging wheels 4 provided with pneumatic tires 6. Driving of the rear wheels is effected by suitable driving mechanism on the tractor, which rotates live rear axle sections 7 upon which the wheels are secured; the axle sections 7 passing through stationary rear axle housings 8 associated with the wheels.

An operator's station 9 is located at one side of the tractor directly in front of the left rear wheel 4; while trailer vehicle 11 having rear supporting wheels 12 is connected to the tractor body 1 by means of arched or gooseneck, hitch or draft connection 13. The front end of the trailer vehicle is thus supported directly by the tractor; and as can be noted more clearly from Fig. 3, draft connection 13 is movably attached to the top of tractor body 1 adjacent the rear thereof by means of universal ball and socket connection 14. An operator at operator's station 9 can readily manipulate the tractor controls including gear shift lever 16 at the right side of the operator's seat; and also, trailer control mechanism 17 which, in the tractor-trailer vehicle combination illustrated, is of the hydraulic type for controlling flow of fluid in piping 18.

Location of the operator's station 9 at a side of the tractor with the controls located at the side of the operator's station is desirable because such arrangement enables the operator to observe readily not only operation of the tractor, but also operation of the trailer vehicle, and provides a position rendering the controls readily accessible to the operator. However, inasmuch as the left rear driving wheel 4 is directly in back of the operator's station, the operator is directly in the path of flying matter thrown by the wheel. Therefore, I employ a fender 19 over such wheel to protect the operator against such flying matter. Preferably, a similar fender is also provided over the other rear driving wheel. During relative turning movement between the tractor and the trailer vehicle, hitch 13 may strike either of fenders 19; which striking is more prone to occur as a result of pneumatic tires 6 because of possible bouncing that may obtain over rough ground. To preclude damage or breaking of the fenders, I provide each of them with a yieldable mounting which will allow the fender to move should hitch 13 strike it. In yielding, either fender 19 may hit an associated pneumatic tire 6 but this will be immaterial because the tire will also yield and act as a cushion.

With particular reference to Figs. 4, 5 and 6, the yieldable fender mounting of my invention associated with each fender, comprises an inverter V-shaped framework 26 rigidly attached to the tractor. One frame member or leg 27 of each framework 26 extends vertically upward, and is secured to the tractor by brackets 28. The other frame member or leg 29 serves as a brace; being secured at its lower end to axle housing 8 by means of connection 31 on bracket 32 rigidly secured to the axle housing. Such brace 29 is inclined forwardly; and its upper end is secured to a cross shaft 33 extending over tractor body 1 and to which the upper end of each frame member 27 is secured. Thus cross shaft 33 is common to both of the frameworks to enhance rigidity. Preferably, each brace 29 is formed with an integral upwardly extending projection 34 which serves as a stop for limiting turning movement between the tractor and the trailer vehicle, when draft connection 13 strikes it. An intermediate bent portion 35 on the cross shaft 33, shown in Fig. 2, is merely for the purpose of providing clearance for hydraulic mechanism on the tractor.

Cross shaft 33 has a portion 36 projecting outwardly or laterally beyond each framework 26; and the front end of each fender 19 is pivotally mounted on such projecting portion 36 by a bracket structure 37 secured to the front portion of the fender, by any suitable means such as welding, and which includes sleeve 38 journalled on such projecting portion 36. Each sleeve 38 is held against moving laterally off projecting shaft portion 36 by cover flange 39 secured to the end of shaft projection 36. Adjacent its rear, each fender is resiliently or yieldably connected to the tractor by means of a spring thrust telescopic support 41; the upper end of which is pivotally connected at 42 to the fender and the lower end of which is pivotally connected at 43 to bracket 32 rigid with axle housing 8.

With particular reference to Fig. 6, support 41 comprises an outer sleeve 44 telescoped over an inner sleeve 46 having spring abutment member 47 fixedly secured therein by any suitable means, such as welding. A spring 48 is interposed between abutment 47 and a head 49 rigidly secured to the upper end of outer sleeve 44, by any suitable means, such as welding. Spring 48 thus thrusts apart outer sleeve 44 and inner sleeve 46, but allows downward movement of outer sleeve 44 over inner sleeve 46 should draft connection 13 strike the fender. When contact between the fender and draft connection 13 is released, spring 48 will restore the fender to its original position. In this connection, upward relative movement between sleeves 44 and 46 is limited by means of a stop construction comprising rod 51 having its upper end secured in head 49, and which passes loosely through abutment 47 adjacent its lower end; a stop nut construction 52 being provided on the lower end of rod 51 to engage the under side of abutment 47. Preferably, a bumper disc 53 of resilient material is interposed between stop 52 and abutment 47 for absorbing shock.

I claim:

1. A tractor adapted for connection with a vehicle by a draft connection and having ground engaging means which can pass under the draft connection upon relative turning movement between the tractor and the vehicle, a fender over such ground engaging means, and a yieldable mounting for the fender to allow it to move should the draft connection strike the fender.

2. A tractor adapted for connection with a vehicle by a draft connection and having ground engaging means which can pass under the draft connection upon relative turning movement between the tractor and the vehicle, a fender over such ground engaging means, and a yieldable mounting for the fender including a resilient support to allow the fender to move should the draft connection strike the fender.

3. A tractor having a body, an operator's seat at one side of the tractor, a ground engaging driving wheel directly in back of the seat, means on the top of the tractor body adjacent its rear to enable connection of the tractor with a trailer vehicle by an arched draft connection under which the wheel can pass upon relative turning movement between the tractor and the vehicle, a fender over the wheel to protect an operator in such seat from flying matter thrown by the wheel, and a yieldable mounting for the fender to allow it to move should the draft connection strike the fender.

4. A tractor adapted for connection with a vehicle by a draft connection and having ground engaging means which can pass under the draft connection upon relative turning movement between the tractor and the vehicle; a fender over such ground engaging means; and a yieldable mounting for the fender including a framework mounted on the tractor and to which the fender is movably connected, and a spring thrust telescopic support movably connected to the tractor and to the fender.

5. A tractor adapted for connection with a vehicle by a draft connection and having ground engaging means which can pass under the draft connection upon relative turning movement between the tractor and the vehicle; a fender over such ground engaging means; and a yieldable mounting for the fender including a framework mounted on the tractor and to which the fender is movably connected, and a spring thrust telescopic support pivotally connected to the tractor and to the fender; the framework having an upwardly extending stop member against which the draft connection is adapted to strike to limit such turning movement.

6. A tractor having a pair of ground engaging wheels; an axle housing associated with each wheel; a fender over each wheel; and a yieldable mounting for each fender comprising an inverted V-shaped framework mounted on the tractor, one leg of such framework being connected to the axle housing, means pivotally connecting the fender to the framework, and a spring thrust telescopic support pivotally connected to the axle housing and to the fender.

7. A tractor having a pair of ground engaging wheels; an axle housing associated with each wheel; a fender over each wheel; and yieldable mountings for the fenders comprising an upwardly extending frame member secured to the tractor adjacent each side thereof, a cross shaft connected to the frame members and projecting outwardly beyond each frame member, a brace connected to each axle housing and to the cross shaft, means pivotally connecting each fender to an outwardly projecting portion of the cross shaft, and a spring thrust telescopic support pivotally connected to each axle housing and to the fender.

8. A tractor having ground engaging means, a vehicle adapted to be propelled by the tractor and having a draft connection with the tractor under which the ground engaging means can pass upon relative turning movement between the tractor and the vehicle, a fender over the ground engaging means, and means for precluding damage to the fender should the draft connection strike it upon such relative turning movement comprising a yieldable supporting structure on the tractor for the fender.

CARL A. GUSTAFSON.